US008819319B2

(12) United States Patent
Shirai et al.

(10) Patent No.: US 8,819,319 B2
(45) Date of Patent: Aug. 26, 2014

(54) COMPUTER SYSTEM AND METHOD FOR INHERITING HBA IDENTIFIER OF PCI CARD

(75) Inventors: Yoshihide Shirai, Hadano (JP); Mitsuaki Watanabe, Sagamihara (JP)

(73) Assignee: Hitachi, Ltd., Tokyo (JP)

(*) Notice: Subject to any disclaimer, the term of this patent is extended or adjusted under 35 U.S.C. 154(b) by 274 days.

(21) Appl. No.: 13/327,825

(22) Filed: Dec. 16, 2011

(65) Prior Publication Data

US 2012/0185634 A1 Jul. 19, 2012

(30) Foreign Application Priority Data

Jan. 19, 2011 (JP) ................................. 2011-008390

(51) Int. Cl.
*G06F 13/38* (2006.01)

(52) U.S. Cl.
CPC .................................... *G06F 13/385* (2013.01)
USPC ........... 710/104; 710/301; 710/302; 710/313; 710/316; 714/5.1

(58) Field of Classification Search
USPC ......................................................... 710/301
See application file for complete search history.

(56) References Cited

U.S. PATENT DOCUMENTS

| 6,148,355 | A  | * | 11/2000 | Mahalingam   | 710/104 |
|-----------|-----|---|---------|--------------|---------|
| 6,170,028 | B1 | * | 1/2001  | Wallach et al. | 710/302 |
| 6,173,346 | B1 | * | 1/2001  | Wallach et al. | 710/302 |
| 6,202,111 | B1 | * | 3/2001  | Wallach et al. | 710/302 |
| 6,219,734 | B1 | * | 4/2001  | Wallach et al. | 710/302 |
| 6,243,773 | B1 | * | 6/2001  | Mahalingam   | 710/302 |
| 6,247,080 | B1 | * | 6/2001  | Wallach et al. | 710/302 |
| 6,249,828 | B1 | * | 6/2001  | Wallach et al. | 710/302 |
| 6,263,387 | B1 | * | 7/2001  | Chrabaszcz   | 710/302 |
| 7,334,064 | B2 | * | 2/2008  | Davies et al. | 710/62  |
| 7,464,205 | B2 | * | 12/2008 | Davies et al. | 710/100 |
| 7,464,214 | B2 | * | 12/2008 | Davies et al. | 710/302 |
| 7,549,076 | B2 |   | 6/2009  | Hatasaki et al. |       |
| 7,676,600 | B2 | * | 3/2010  | Davies et al. | 709/250 |
| 7,743,189 | B2 | * | 6/2010  | Brown et al. | 710/104 |
| 2001/0052042 | A1 | * | 12/2001 | Wallach et al. | 710/103 |
| 2005/0010709 | A1 | * | 1/2005  | Davies et al. | 710/305 |
| 2006/0168370 | A1 | * | 7/2006  | Dew et al.   | 710/49  |
| 2007/0100933 | A1 | * | 5/2007  | Davies et al. | 709/203 |
| 2009/0228611 | A1 | * | 9/2009  | Ferguson et al. | 710/8 |
| 2010/0049822 | A1 | * | 2/2010  | Davies et al. | 709/213 |
| 2010/0146327 | A1 | * | 6/2010  | Takubo       | 714/4   |

FOREIGN PATENT DOCUMENTS

JP 2009-245455 A 10/2009
JP 2010-039729 A 2/2010

* cited by examiner

*Primary Examiner* — Ryan Stiglic
(74) *Attorney, Agent, or Firm* — Volpe and Koenig, P.C.

(57) ABSTRACT

A PCI card's HBA identifier table held in an IODC in an IO slot expansion unit is read and recorded on a PCIe switch register of a PCIe switch. After a server blade is powered on so that an EFI is activated, the EFI reads the HBA identifier table recorded on the PCIe switch register and updates an HBA identifier of an HBA mounted in each PCI card. The HBA mounted in the PCI card operates with the updated HBA identifier of the PCI card. Thus, even when the PCI card is replaced by a new PCI card because of failure or the like, the new PCI card can operate with the same HBA identifier as that before the replacement. Therefore, a user does not have to register the HBA identifier of the PCI card newly in a device connected to the PCI card.

7 Claims, 8 Drawing Sheets

WWN ALLOCATION TABLE

| PCI CARD SLOT IDENTIFIER (601) | PORT NUMBER ON PCI CARD (602) | ALLOCATED WWN (603) |
|---|---|---|
| C0 (IDENTIFIER OF PCI CARD SLOT 118-1) | 0 | 24:00:00:00:87:03:3F:00 |
| C1 (IDENTIFIER OF PCI CARD SLOT 118-2) | 0 | 24:00:00:00:87:03:3F:04 |

MULTI-ROUTE PCIe SWITCH CONNECTION INFORMATION

| PCIe PORT IDENTIFIER OF IO SLOT EXPANSION UNIT 1101 | IDENTIFIER OF CONNECTION PCI CARD SLOT 1102 |
|---|---|
| P0 (IDENTIFIER OF PCIe PORT 116-1) | C0 (IDENTIFIER OF PCI CARD SLOT 118-1) |
| P1 (IDENTIFIER OF PCIe PORT 116-2) | C1 (IDENTIFIER OF PCI CARD SLOT 118-2) |

COMPUTER SYSTEM AND METHOD FOR INHERITING HBA IDENTIFIER OF PCI CARD

INCORPORATION BY REFERENCE

The present application claims priority from Japanese application JP 2011-008390 filed on Jan. 19, 2011, the content of which is hereby incorporated by reference into this application.

BACKGROUND OF THE INVENTION

1. Field of the Invention

The present invention relates to a computer system for managing an HBA identifier of a PCI card mounted in an IO slot expansion unit serving as a constituent member of the computer system, and a method for inheriting the HBA identifier of the PCI card.

2. Description of the Background Art

There is a computer system which is formed so that a server chassis capable of being loaded with server blades of arithmetic system devices each composed of a CPU, a memory, etc. and an IO slot expansion unit capable of being loaded with PCI cards such as FC (Fibre Channel) PCI cards, Ethernet PCI cards, etc. are connected to each other by a PCIe cable. The IO slot expansion unit is further loaded with a PCIe switch. When setting of the PCIe switch is edited, connection between the server blades and the PCI cards can be switched.

As the background art in this technical field, there is JP-A-2009-245455 (Patent Document 1). In this official gazette, "setting of disk mapping" has been described in terms of connection setting of LUs. In JP-A-2010-39729 (Patent Document 2), there has been disclosed a multi-route PCIe switch server system with the server chassis described as "server device" and the IO slot expansion unit described as "external I/O device".

When a PCI card mounted in the IO slot expansion unit is replaced by a new PCI card because of failure or the like, the HBA identifier (which corresponds to a WWN if the PCI card is an FC PCI card or an MAC etc. if the PCI card is an Ethernet PCI card) of the PCI card before the replacement varies from the HBA identifier of the PCI card after the replacement. For this reason, after replacement of the PCI card has occurred, it is necessary that a user should register the BEA identifier of the PCI card newly in a device connected to the PCI card. There is however a problem that much labor and time is taken for such new registration work.

SUMMARY OF THE INVENTION

In order to solve the foregoing problem, the invention provides a computer system and an HBA identifier inheriting method. In the computer system in which a server chassis having at least one server and an IO slot expansion unit loaded with a PCIe switch are connected to each other by a PCIe cable, a PCIe switch register update control portion of an IO slot expansion unit controller in the IO slot expansion unit copies an identifier allocation table from the IO slot expansion unit controller to an identifier storage area of a PCIe switch register as soon as the IO slot expansion unit is powered on. On the other hand, an HBA identifier update control portion of an interface of the server acquires the identifier allocation table copied to the identifier storage area of the PCIe switch register through the PCIe cable as soon as the server is powered on. The HBA identifier update control portion stores the acquired identifier allocation table in a storage portion of the server. The HBA identifier update control portion refers to an identifier allocated in accordance with a PCI card slot and an HBA port on a PCI card from the identifier allocation table stored in the storage portion. The HBA identifier update control portion updates an identifier recorded in an identifier area of an HBA to the allocated identifier referred to from the identifier allocation table stored in the storage portion.

That is, a PCI card's HBA identifier table is read from the IO slot expansion unit controller (JO Drawer Controller, hereinafter referred to as IODC) in the IO slot expansion unit and recorded on the PCIe switch register of the PCIe switch. After a server blade is powered on so that an Extensible Firmware Interface (hereinafter referred to as EFI) is activated, the EFI reads the HBA identifier table recorded on the PCIe switch register and updates the HBA identifier of the HBA mounted on the PCI card. The HBA mounted on the PCI card operates with the updated HBA identifier of the PCI card.

Even when a PCI card mounted in a PCI card slot on the IO slot expansion unit is replaced by a new PCI card because of failure of the PCI card or the like, the PCI card after the replacement can operate with the same HBA identifier as that before the replacement. Accordingly, a user does not have to register the HBA identifier of the PCI card newly in a device connected to the PCI card.

Other objects, features and advantages of the invention will become apparent from the following description of the embodiments of the invention taken in conjunction with the accompanying drawings.

DETAILED DESCRIPTION OF THE INVENTION

Embodiment 1

Figure 1:
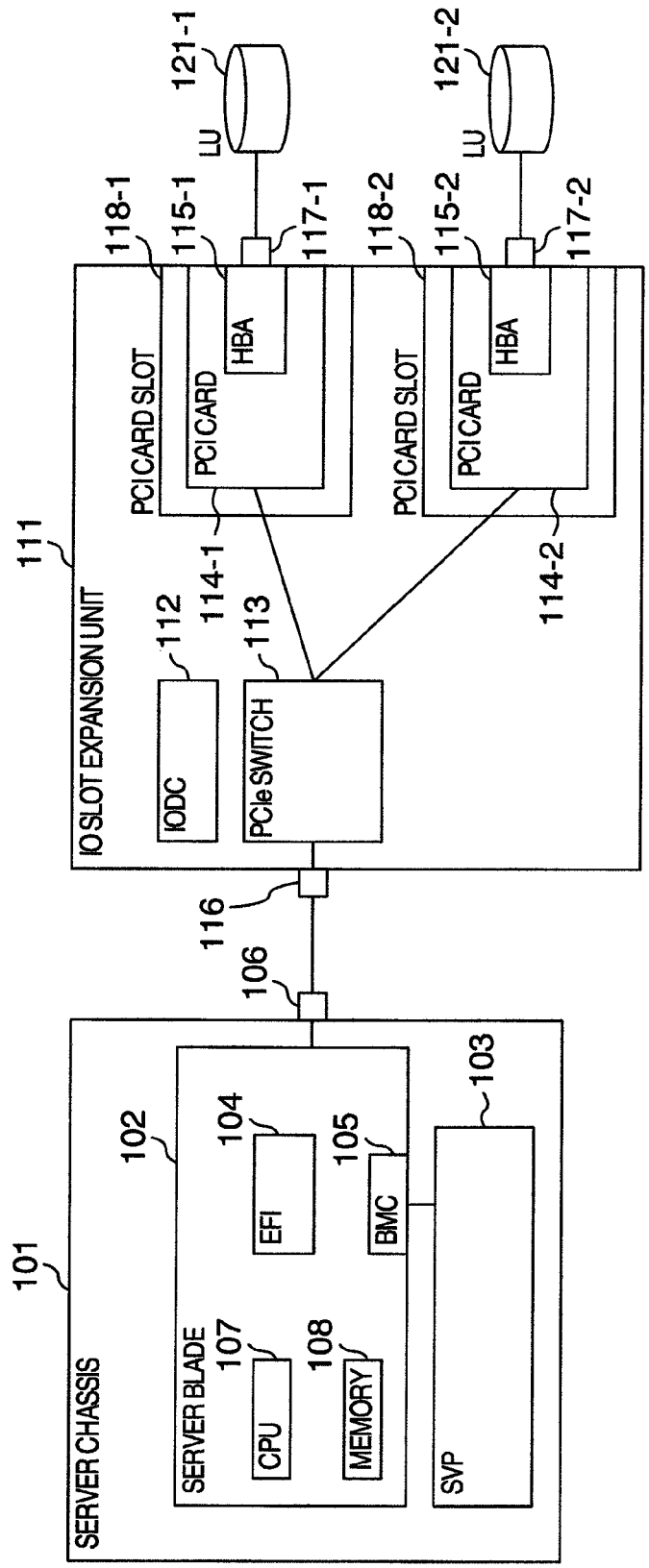
FIG. 1 is an overall diagram of a system.

FIG. 1 shows a system configuration diagram of a computer system to which the invention is applied. The system according to Embodiment 1 includes a server chassis 101, and an IO slot expansion unit 111.

The server chassis 101 includes a server blade 102, and an SVP 103 serving as a server chassis management controller. The server blade 102 and the SVP 103 are connected to each other.

The SVP 103 has a built-in memory which stores programs and data, and a built-in CPU which executes the programs. A CPU 107, a memory 108, an EFI 104, and a BMC 105 which is a server blade management controller are mounted in the server blade 102. The server blade 102 is connected to a server chassis PCIe port 106.

The IO slot expansion unit 111 includes an IODC 112 serving as an IO slot expansion unit management controller, a PCIe switch 113, and PCI card slots 118. PCI cards 114 can be mounted in the PCI card slots 118 respectively. The IODC 112 and the PCIe switch 113 are connected to each other so as to be able to communicate with each other. The PCIe switch 113 is connected to each of the PCI card slots 118 by PCIe. The IODC has a built-in memory which stores programs and data, and a built-in CPU which executes the programs. The PCIe switch 113 and an IO slot expansion unit PCIe port 116 are connected to each other.

Figure 2:
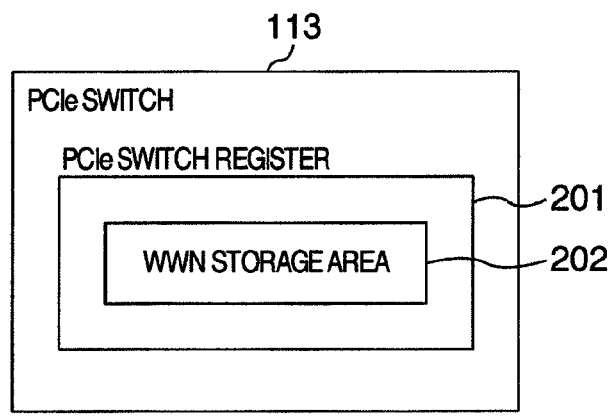
FIG. 2 is a functional block diagram of a PCIe switch.

FIG. 2 shows a functional block diagram of the PCIe switch 113. The PCIe switch 113 includes a PCIe switch register 201 which includes a WWN storage area 202.

Figure 3:
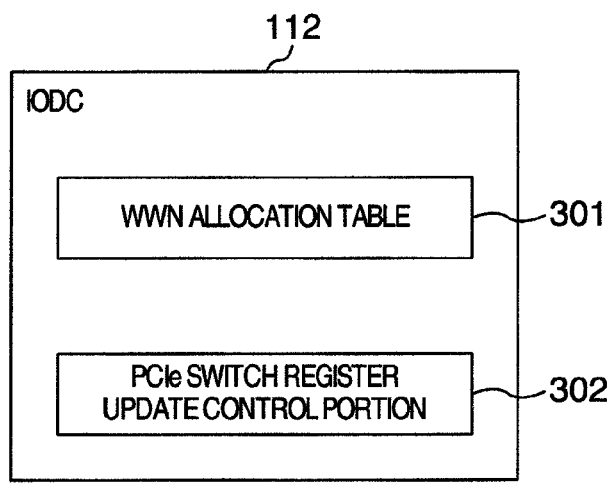
FIG. 3 is a functional block diagram of an IODC.

FIG. 3 shows a functional block diagram of the IODC 112. The IODC includes a WWN allocation table 301, and a PCIe switch register update control portion 302.

Figure 4:
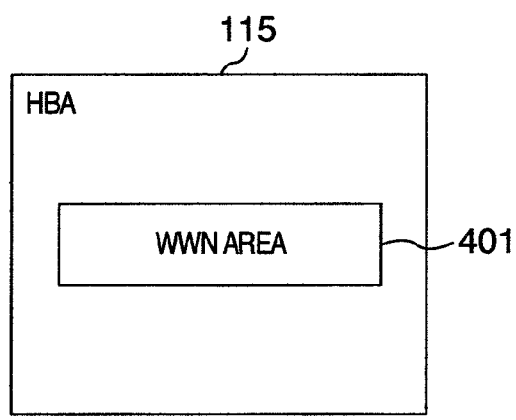
FIG. 4 is a functional block diagram of an HBA.

FIG. 4 shows a functional block diagram of an HBA 115. The HBA 115 includes a WWN area 401 which stores a WWN.

Figure 5:
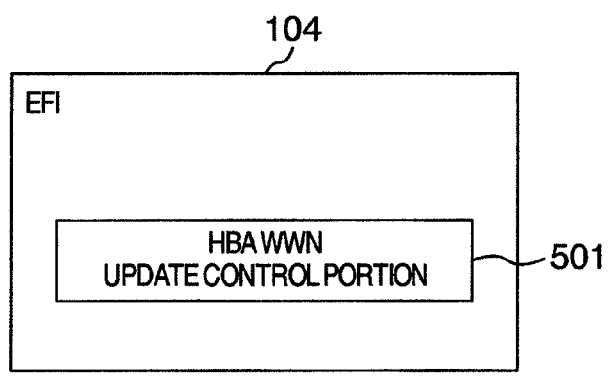
FIG. 5 is a function block diagram of an EFI.

FIG. 5 shows a functional block diagram of the EFI 104. The EFI includes an HBA WWN update control portion 501.

Figures 6, 7:
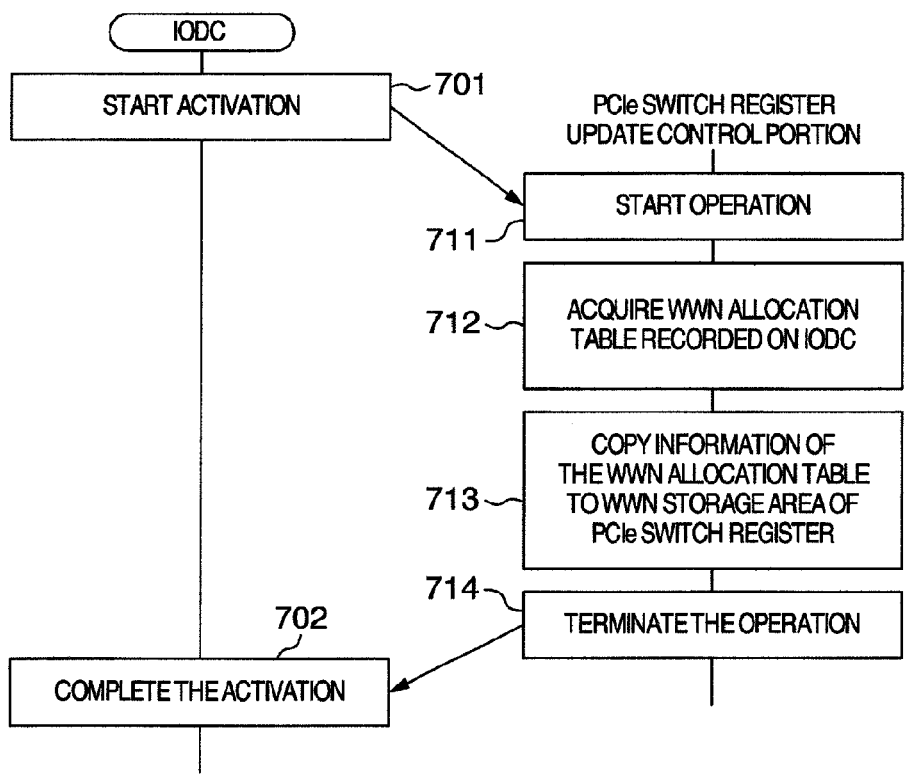
FIG. 6 is a WWN allocation table.
FIG. 7 is a flow chart of activation of an IO slot expansion unit.

FIG. 6 shows a WWN allocation table. An identifier 601 of each PCI card slot in the IO slot expansion unit, a port number 602 on a PI card inserted into the PCI card slot and an allocated WWN 603 corresponding to the PCI card slot identifier 601 and the port number 602 are provided as items of the table. The table is held in the IODC 112.

FIG. 7 shows a flow chart of activation of the IO slot expansion unit.

In Step 701, activation of the IODC 112 is started with powering on the IO slot expansion unit 111 as a trigger.

In Step 711, operation of the PCIe switch register update control portion 302 is started with starting the activation of the IODC as a trigger.

In Step 712, the PCIe switch register update control portion 302 acquires a WWN allocation table 301 recorded on the IODC.

In Step 713, the PCIe switch register update control portion 302 copies information of the WWN allocation table acquired in Step 712 to the WWN storage area 202 of the PCIe switch register 201.

In Step 714, the operation of the PCIe switch register update control portion 302 is terminated.

In Step 702, the activation of the IODC is completed.

Figure 8:
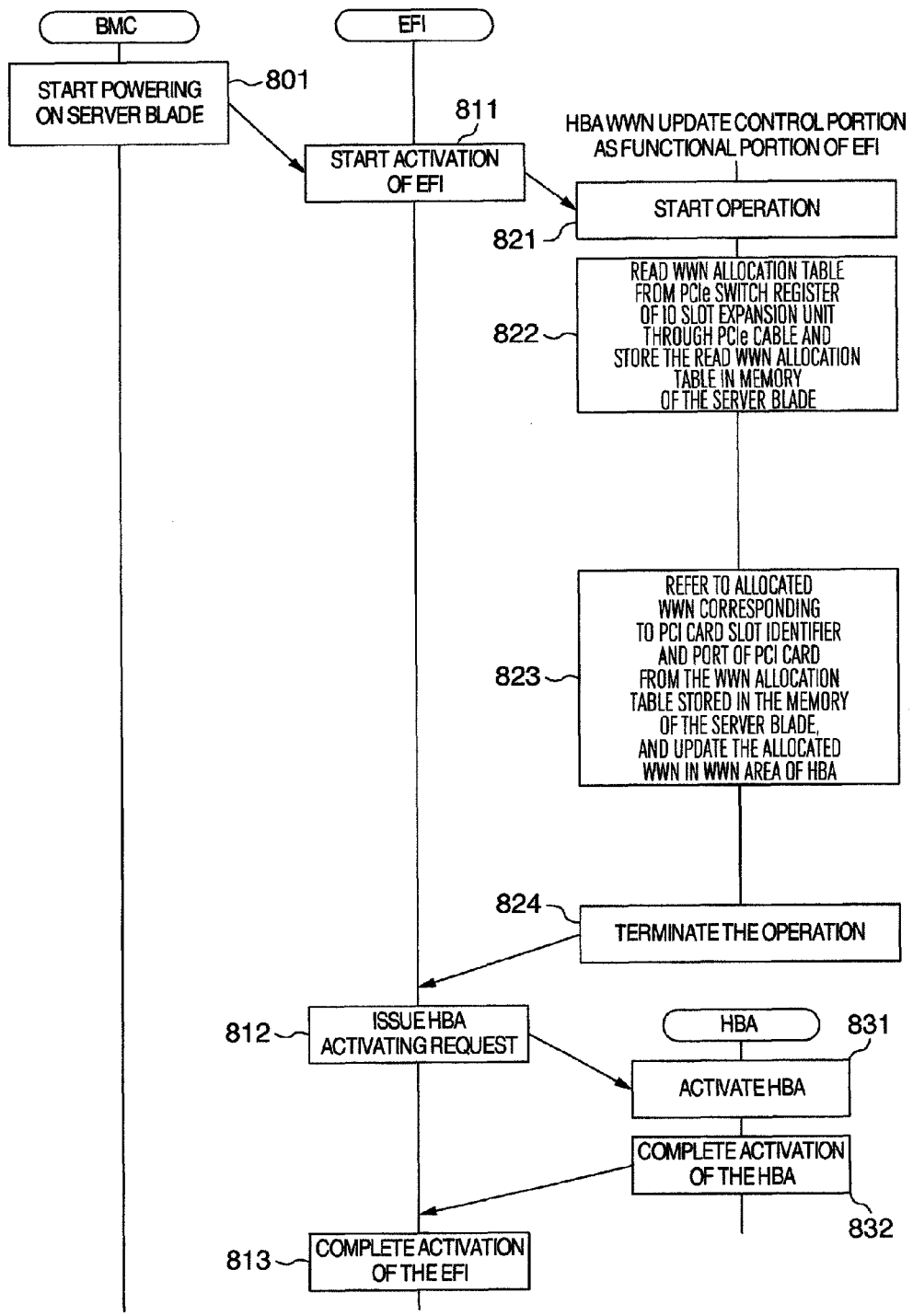
FIG. 8 is a flow chart of activation of the system.

FIG. 8 shows a flow chart of activation of the system.

In Step 801, the BMC starts powering on the server blade. For example, user operation, schedule, or the like, is assumed as a trigger for the BMC to start powering on the server blade.

In Step 811, activation of the EFI 104 is started with starting powering on the server blade in Step 801 as a trigger. Since the server blade is powered on, the EFI 104 on the server blade 102 is enabled to refer to the PCIe switch register 201 of the PCIe switch 113 and control the HBA's 115-1 and 115-2 of the PCI cards 114-1 and 114-2 through the PCIe switch 113.

In Step 821, operation of the HBA WWN update control portion 501 as one functional portion of the EFI 104 is started with starting the activation of the EFI in Step 811 as a trigger.

In Step 822, the HBA WWN update control portion 501 reads the WWN allocation table copied to the WWN storage area 202 from the IODC 112 by referring to the PICe switch register 201 of the PICe switch 113 in the IO slot expansion unit 111 through the PCIe cable. The WWN allocation table read from the WWN storage area 202 is stored in the memory 108 of the server blade 102.

In Step 823, the HBA WWN update control portion 501 refers to an allocated WWN corresponding to the PCI card slot identifier and the number of the HBA port 117 on the PCI card, from the WWN allocation table stored in the memory 108 of the server blade 102. The HBA WWN update control portion 501 updates a WWN of the HBA port recorded on the WWN area 401 of the HBA 115-1 to the allocated WWN referred to, through the HBA 115-1. The HBA WWN update control portion 501 also updates another allocated WWN for the HBA 115-2 in the same manner as that for the HBA 115-1.

In Step 824, the operation of the HBA WWN update control portion 501 is completed. In Step 812, the EFI 104 issues a request to activate the HBA 115-1. The EFI 104 also issues a request to activate the HBA 115-2 in the same manner.

In Steps 831 and 832, activation of the HBA 115-1 is started upon reception of the HBA activating request issued from the EFI 104, and then the activation of the HBA 115-1 is completed. The HBA 115-1 reads the WWN area 401 of the HBA 115-1 and operates with the WWN updated in Step 823. The EFI 104 makes operation for the HBA 115-2 in the same manner.

In Step 813, the activation of the EFI 104 is completed.

When the PCI card 114-1 or 114-2 mounted in the IO slot expansion unit 111 is replaced by a new PCI card because of failure or the like, the identifier for the HBA port of each PCI card (which corresponds to the WWN if the PCI card is an FC PCI card or to an MAC etc. if the PCI card is an Ethernet PCI card) after occurrence of the failure varies from that before occurrence of the failure. For this reason, it is necessary to register the HBA identifier of the PCI card 114-1 or 114-2 newly in a device connected to the PCI card.

In a blade server of a background-art system having no IO slot expansion unit 111, that is, a blade server having a server blade, an SVP and PCI cards in a server chassis, the SVP holds a WWN allocation table. A BMC in the server blade refers to the WWN allocation table held in the SVP, and an EFI in the server blade acquires the WWN allocation table through the BMC, so that the same WWN as that before replacement is allocated to the HBA of the PCI card after replacement.

On the contrary, in the computer system having the IO slot expansion unit 111 according to Embodiment 1, if the WWN allocation table is held in the SVP 103 in the server chassis 101, the WWN table needs to have an estimated maximum number of WWN's allocated to the IO slot expansion unit to be connected to the server chassis 101. Consequently, an unnecessary large number of WWN's are required.

Therefore, in the computer system to which the invention is applied, the WWN allocation table 301 is not held in the SW 103 but held in the IODC 112 in the IO slot expansion unit 111 and copied from the IODC 112 to the PCIe switch register 201 of the PCIe switch 113. The EFI 104 in the server chassis 101 is formed to be allowed to refer to the WWN allocation table copied to the WWN storage area 202 of the PCIe switch register 201 through the PCIe cable. The EFI 104 updates the WWN of each PCI card 114 with powering on the server blade 102 as a trigger. Therefore, even when one PCI card 114 is replaced with a new one because of failure or the like, the HBA of the new PCI card 114 inherits the same WWN as that of the HBA of the PCI card before replacement and operates with the inherited WWN as long as the new PCI card 114 is mounted in the same PCI card slot 118 in the IO slot expansion unit 111.

In this manner, the HBA 115 of the PCI card 114 after the replacement operates with the same WWN as that of the PCI card 114 before the replacement. Accordingly, when there is WWN registration setting in an external device connected to the PCI card 114, it is not necessary to register a new WWN in the external device. In the embodiment, LU connection setting for a FC-connected storage is a setting example in which setting can be dispensed with. The LU connection setting means registration of the WWN of a HBA connected in accordance with each LU. Usually, when the PCI card connected in accordance with each LU changes, the HBA and the WWN also change so that the LU connection setting has to be edited correspondingly. In this embodiment, it is not necessary to edit the LU connection setting because the WWN does not change even if the HBA changes.

Although the FC WWN is taken as an example of the HBA identifier in the embodiment, the same thing can be achieved easily when an Ethernet (registered trademark) MAC or the like is used as another example of the HBA identifier.

Embodiment 2

Figure 9:
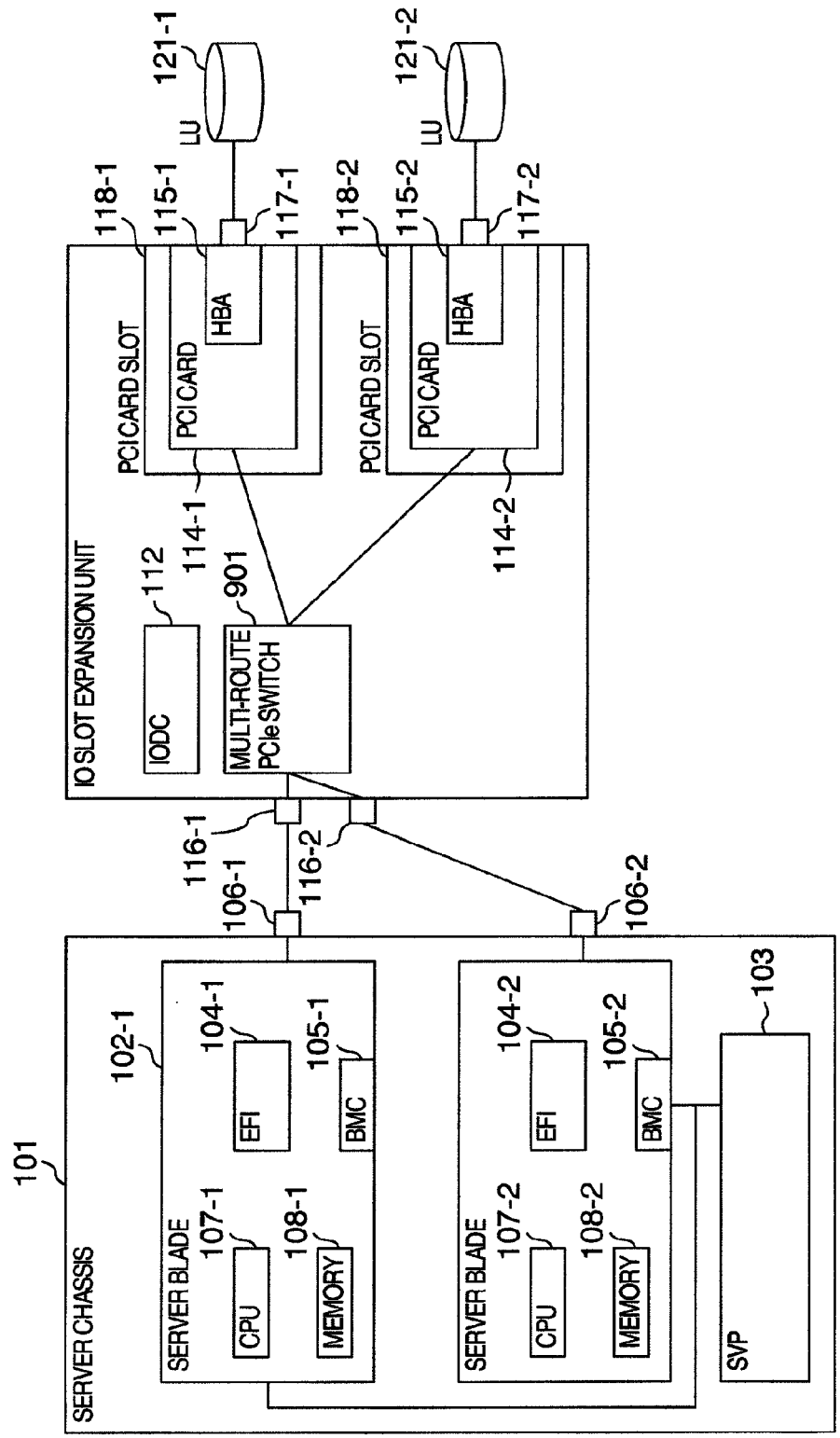
FIG. 9 is a configuration diagram of a multi-route switch system.

FIG. 9 is an overall diagram showing Embodiment 2 of the invention. Embodiment 2 is different from Embodiment 1 in that a PCIe switch 901 in an IO slot expansion unit is a multi-route switch capable of being connected to a plurality of server blades 102, in place of a single-route switch connected to one server blade. Because the PCIe switch 901 is a multi-route switch, PCIe ports 116-1 and 116-2 are provided in the IO slot expansion unit and connected to different server blades respectively.

Figures 10, 11:
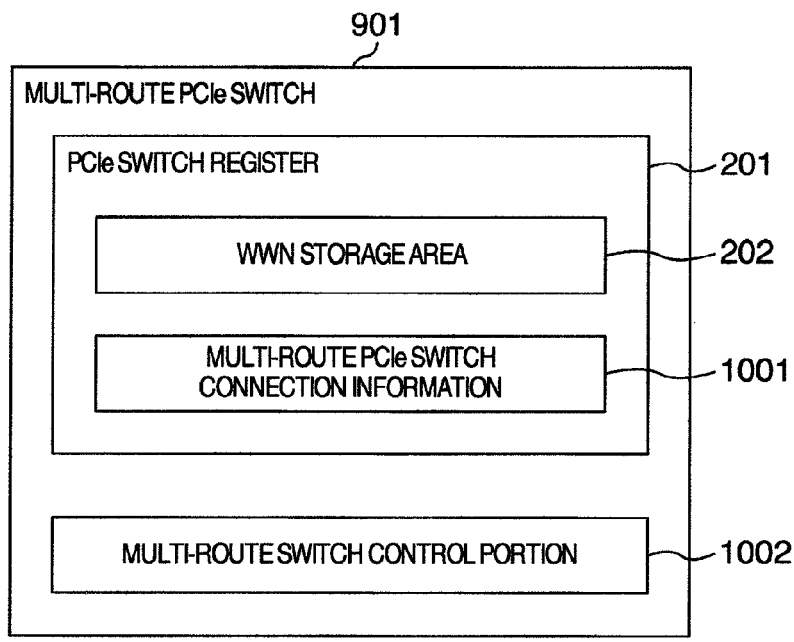
FIG. 10 is a functional block diagram of a multi-route PCIe switch.
FIG. 11 is a view showing connection information of the multi-route PCIe switch.

FIG. 10 is a functional block diagram of the multi-route PCIe switch. The PCIe switch in FIG. 10 is different from the PCIe switch in FIG. 2 in that the PCIe switch in FIG. 10 has a multi-route switch control portion 1002, and that multi-route PCIe switch connection information 1001 is added to the PCIe switch register.

The multi-route PCIe switch connection information 1001 means connection setting information of one single PCI card slot 118 or a plurality of PCI card slots 118 to all the PCIe ports 116 in the IO slot expansion unit. By the multi-route PCIe switch, PCI card slots can be connected to each PCIe port. As for the PCIe switch connection information 1001 in FIG. 11, a plurality of connection PCI card slot identifiers 1102 can be held for each PCIe port identifier 1101 in the IO slot expansion unit. The multi-route switch control portion 1002 performs control for switching connection between the PCIe ports and the PCI card slots based on the multi-route PCIe switch connection information 1001.

FIG. 11 shows connection information of the multi-route PCIe switch. The connection information is provided as a table having PCIe port identifiers 1101 in the IO slot expansion unit and corresponding connection PCI card slot identifiers 1102. The multi-route PCIe switch connection information is created by a user through the IODC 112. Incidentally, a flow chart of activation of the IO slot expansion unit in the multi-route PCIe switch is the same as that in the single-route PCIe switch (FIG. 7) in Embodiment 1.

Figure 12:
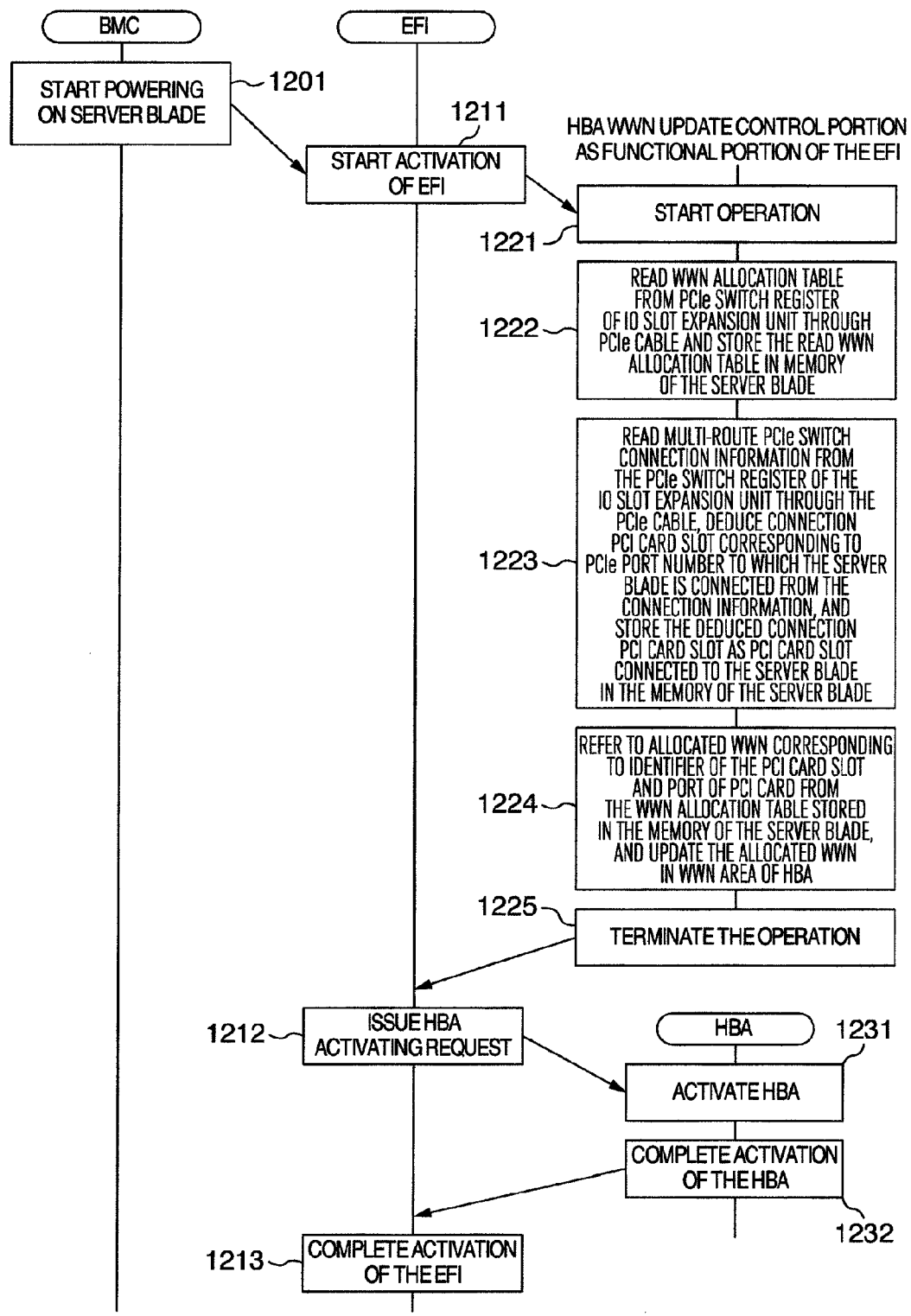
FIG. 12 is a flow chart of activation of a multi-route IO slot expansion unit.

FIG. 12 is a flow chart of activation of the system in the multi-route PCIe switch. To make description specifically, the case of activation of a server blade 102-1 will be described below.

In Step 1201, a BMC 105-1 starts powering on the server blade. For example, user operation, schedule, or the like, is assumed as a trigger for the BMC 105-1 to start powering on the server blade.

In Step 1211, activation of an EFI 104-1 is started with starting powering on the server blade in Step 1201 as a trigger.

In Step 1221, operation of an HBA WWN update control portion 501 as one functional function of the EFI 104-1 is started with starting activation of the EFI 104-1 in Step 1211 as a trigger.

In Step 1222, the HBA WWN update control portion 501 reads a WWN allocation table copied to a WWN storage area from the IODC by referring to a PCIe switch register 201 of the PCIe switch 901 in the IO slot expansion unit through a PCIe cable. The WWN allocation table read from the WWN storage area 202 is stored in a memory 106-1 of the server blade.

In Step 1223, the HBA WWN update control portion 501 reads the multi-route PCIe switch connection information 1001 by referring to the PCIe switch register 201 of the PCIe switch 901 in the IO slot expansion unit through the PCIe cable. The HBA WWN update control portion 501 deduces that a connection PCI card slot corresponding to the connected PCIe port 116-1 is 118-1, from the read multi-route PCIe switch connection information 101. As a result, connection relation information indicating that the PCI card slot connected to the server blade 102-1 is 118-1 is stored in the memory of the server blade. That is, in this step, the HBA WWN update control portion 501 can specify the identifier of the PCI card slot which is provided in the IO slot expansion unit and which is connected to the server blade 102-1.

In Step 1224, the HBA WWN update control portion 501 refers to the WWN allocation table stored in the memory of the server blade in Step 1222, the PCI card slot identifier which corresponds to the server blade connection PCI card slot and which is stored in the memory of the server blade in Step 1223, and the allocated WWN corresponding to the port number on the PCI card. The HBA WWN update control portion 501 updates the WWN recorded on the WWN area of the HBA 115-1 to the allocated WWN referred to.

In Step 1225, the operation of the HBA WWN update control portion 501 is terminated.

In Step 1212, the EFI issues a request to activate the HBA 115-1.

In Steps 1231 and 1232, activation of the HBA 115-1 is started upon reception of the HBA activating request issued from the EFI, and then the activation of the HBA 115-1 is completed. The HBA reads the WWN area of the HBA and operates with the updated WWN which was updated in Step 1224.

In Step 1213, the activation of the EFI is completed.

As described above, in the multi-route PCIe switch, even when a PCI card is replaced by a new PCI card, the HBA of the new PCI card operates with the same WWN as long as the new PCI card is mounted in the same PCI card slot in the IO slot expansion unit. Since the HBA of the new PCI card operates with the same WWN, it is unnecessary to edit WWN registration setting in the case where the setting is provided in an external device connected to the PCI card.

Although the WWN is taken as an example of the HBA identifier in the embodiment, the same thing can be achieved easily when an MAC or the like is used as another example of the HBA identifier.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A computer system formed so that a server chassis having at least one server and an IO slot expansion unit loaded with a PCIe switch are connected to each other by a PCIe cable,
wherein:
the server has an arithmetic portion, a storage portion, and an
HBA identifier update control portion;
the IO slot expansion unit has the PCIe switch, an IO slot expansion unit controller connected to the PCIe switch, and a plurality of PCI card slots connected to the PCIe switch;
a first PCI cards having a first HBA and a first HBA port is mounted in a first PCI card slot, the first PCI card slot is identified by a first PCI card slot identifier, and the first HBA port is assigned a first port number;
the first HBA has a first identifier area which is arranged to hold a first allocated identifier by which the first HBA port is identified;
the PCIe switch has a PCIe switch register;
the IO slot expansion unit controller has a PCIe switch register update control portion and an identifier allocation table for managing the first PCI card slot identifier of the first PCI card slot, the first port number of the first HBA port on the first PCI card, and the first allocated identifier corresponding to the first PCI card slot identifier;
the PCIe switch register update control portion is arranged to copy the identifier allocation table of the IO slot expansion unit controller to an identifier storage area of the PCIe switch register in the PCIe switch in response to powering on the IO slot expansion unit; and
the HBA identifier update control portion is arranged to:
acquire the identifier allocation table copied to the identifier storage area of the PCIe switch register in the PCIe switch through the PCIe cable in response to powering on the server;
store the acquired identifier allocation table in the storage portion of the server;
refer to the first allocated identifier corresponding to the first PCI card slot identifier and the first port number of the first HBA port on the first PCI card in the identifier allocation table stored in the storage portion; and
in a case where the first PCI card is replaced with a second PCI card having a second identifier area and a second HBA port in the first PCI card slot connected to the PCIe switch, update an allocated identifier of the second HBA port, which is assigned the first port number, in the second identifier area to the first allocated identifier.

2. The computer system according to claim 1, wherein the first allocated identifier is a WWN.

3. The computer system according to claim 1, wherein the first allocated identifier is a MAC address.

4. The computer system according to claim 1, wherein the PCIe switch is a single-route PCIe switch.

5. The computer system according to claim 1, wherein:
the PCIe switch is a multi-route PCIe switch which has the PCIe switch register and a multi-route switch control portion; and
the PCIe switch register has the identifier storage area and multi-route PCIe switch connection information.

6. The computer system according to claim 5, wherein:
the HBA identifier update control portion is arranged to:
acquire the identifier allocation table copied to the identifier storage area of the PCIe switch register in the PCIe switch through the PCIe cable in response to powering on the server;
store the acquired identifier allocation table in the storage portion of the server;
read the multi-route PCIe switch connection information from the PCIe switch register in the PCIe switch of the IO slot expansion unit through the PCIe cable;
store connection relation information on which the first PCI card slot to which the server is connected based on the multi-route PCIe switch connection information, in the storage portion;
refer to the first allocated identifier corresponding to the first PCI card slot identifier identified from the connection relation information and the first port number from the identifier allocation table stored in the storage portion; and
in a case where the first PCI card is replaced with the second PCI card having the second identifier area and the second HBA port in the first PCI card slot connected to the server and the PCIe switch, update the allocated identifier of the second HBA port, which is assigned the first port number, in the second identifier area to the first allocated identifier.

7. An HBA identifier inheriting method in a computer system formed so that a server chassis having at least one server and an IO slot expansion unit loaded with a PCIe switch are connected to each other by a PCIe cable, wherein:
the server has an arithmetic portion, a storage portion, and an HBA identifier update control portion;
the IO slot expansion unit has the PCIe switch, an JO slot expansion unit controller connected to the PCIe switch, and a plurality of PCI card slots connected to the PCIe switch;
a first PCI card having a first HBA and a first HBA port is mounted in a first PCI card slot, the first PCI card slot is identified by a first PCI card slot identifier and the first HBA port is assigned a first port number;
the first HBA has a first identifier area which is arranged to hold a first allocated identifier by which the first HBA port is identified;
the PCIe switch has a PCIe switch register;
the IO slot expansion unit controller has a PCIe switch register update control portion and an identifier allocation table for managing the first PCI card slot identifier of the first PCI card slot, the first port number of the first HBA port on the first PCI card, and the first allocated identifier corresponding to the first PCI card slot identifier; and
the HBA identifier inheriting method includes the steps of:
making the PCIe switch register update control portion copy the identifier allocation table of the JO slot expansion unit controller to an identifier storage area of the PCIe switch register in the PCIe switch in response to powering on the IO slot expansion unit;
making an HBA identifier update control portion acquire the identifier allocation table copied to the identifier storage area of the PCIe switch register in the PCIe switch through the PCIe cable in response to powering on the server;
store the acquired identifier allocation table in the storage portion of the server;
refer to the first allocated identifier corresponding to the first PCI card slot identifier and the first port number of the first HBA port on the first PCI card in the identifier allocation table stored in the storage portion; and in a case where the first PCI card is replaced with a second PCI card having a second identifier area and a second HBA port in the first PCI card slot connected to the PCIe switch, update an allocated identifier of the second HBA port, which is assigned the first port number, in the second identifier area to the first allocated identifier.

\* \* \* \* \*